United States Patent [19]

Snedeker

[11] Patent Number: 4,609,075
[45] Date of Patent: Sep. 2, 1986

[54] SHOPPING CART DISABLING DEVICE

[76] Inventor: Nelson W. Snedeker, P.O. Box 2010, Sparks, Nev. 89431

[21] Appl. No.: 158,600

[22] Filed: Jun. 11, 1980

[51] Int. Cl.$^4$ .............................................. B60T 1/14
[52] U.S. Cl. ................... 188/5; 280/33.99 C
[58] Field of Search .......................... 188/5–8, 188/31, 110, 111, 19; 280/33.99 C; 60/632–638

[56] References Cited

U.S. PATENT DOCUMENTS

| 2,964,140 | 9/1959 | Berezny | 188/111 |
| 3,002,370 | 10/1961 | Brie | 280/33.99 |
| 3,029,905 | 4/1962 | Nowak | 188/111 |
| 3,031,038 | 4/1962 | Chait | 188/111 |
| 3,090,470 | 5/1963 | Abrams | 188/110 |
| 3,117,655 | 1/1964 | Skupas et al. | 188/111 |
| 3,356,185 | 12/1967 | Isaacks | 188/5 |
| 3,366,201 | 1/1968 | Pesta | 188/110 |
| 3,590,962 | 7/1971 | Parker | 188/111 |
| 3,717,225 | 2/1973 | Rashbaum et al. | 188/111 |
| 3,892,295 | 7/1975 | Hahto | 188/111 |

FOREIGN PATENT DOCUMENTS

| 1109566 | 1/1956 | France | 60/632 |
| 1146576 | 11/1957 | France | 188/5 |

Primary Examiner—Trygve M. Blix
Assistant Examiner—Thomas J. Brahan
Attorney, Agent, or Firm—Roger L. Martin

[57] ABSTRACT

A shopping cart disabling device features the use of pressurized gas from a container for actuating a piston in a cylinder therefor so as to provide a ground contacting probe that serves to disable the cart, the gas container being located in the piston cylinder and the gas being released by a magnetically actuated mechanism that includes a pin for penetrating a seal of the container and a spring loaded hammer mechanism which through a sear is operatively connected to a magnetic triggering assembly.

6 Claims, 9 Drawing Figures

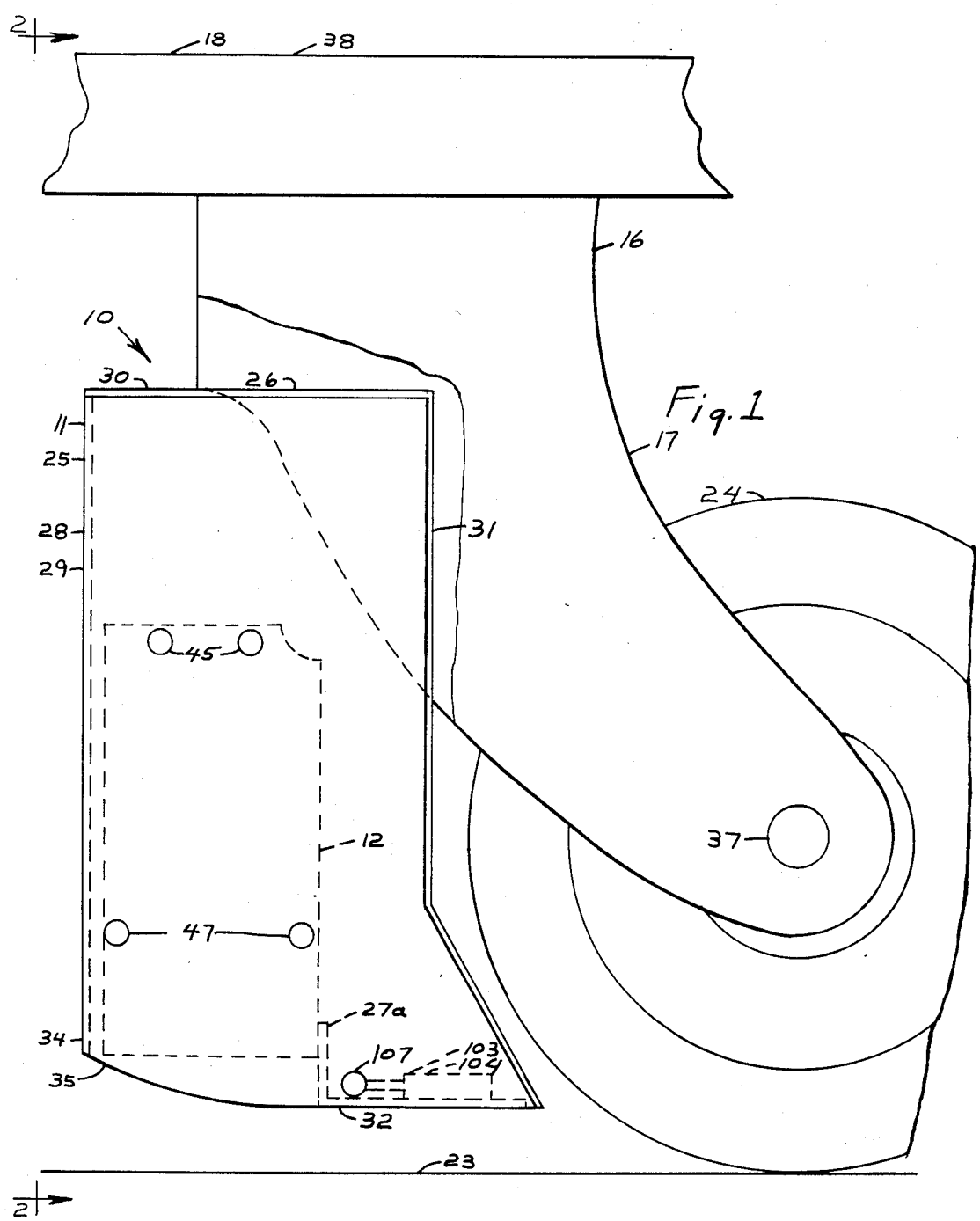

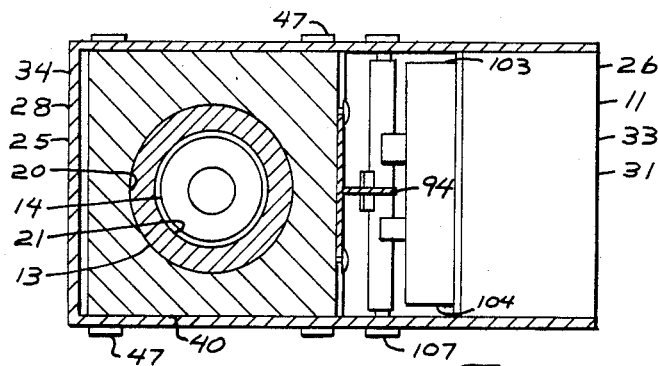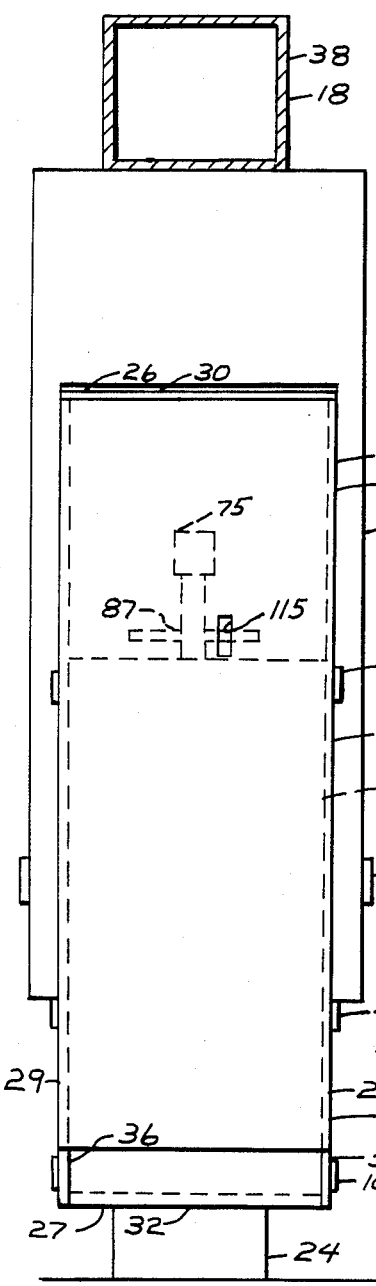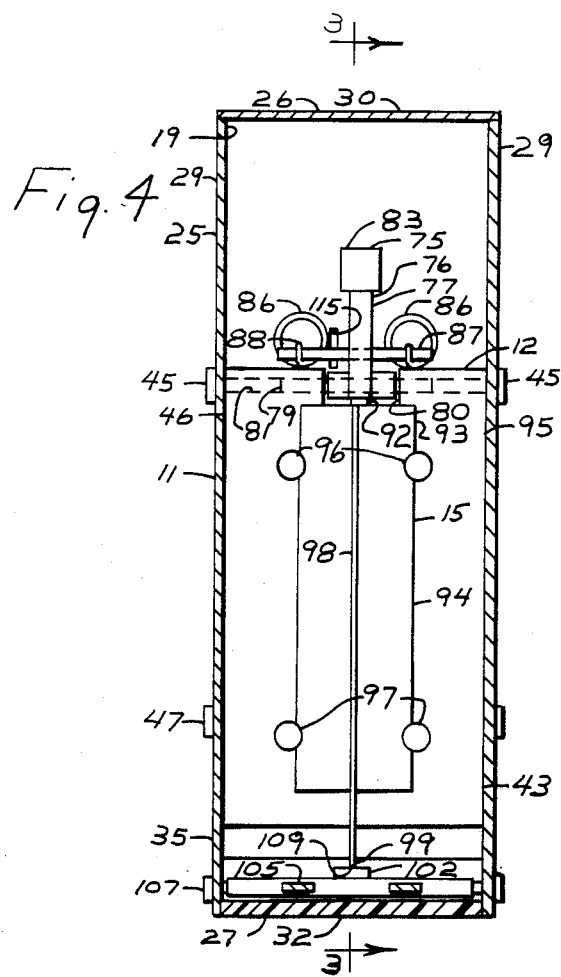

SHOPPING CART DISABLING DEVICE

BACKGROUND OF THE INVENTION

The invention relates to a shopping cart disabling device and more particularly to a device which is attached to a shopping cart and is automatically actuated to disable the cart as the shopping cart is moved beyond the perimeter of the area in which the shopping cart is contemplated for normal use.

The theft and removal of shopping carts from supermarket areas is a well recognized problem and there have been various devices which have been proposed for preventing such thefts and minimizing the unauthorized use of the shopping carts. Most of the devices which are used for such purposes rely on the use of some mechanism that locks up or brakes one of the wheels of the cart. This type device is undesirable because the mechanisms are usually complicated and expensive to manufacture. Apart from this; by operating in conjunction with one of the cart wheels, if a part of the mechanism is faulty or becomes worn out, the cart is usually completely disabled until a replacement part is secured and installed on the shopping cart. The mechanisms in such cases are also complicated and time consuming to be set. Such devices are usually actuated by sensing a depression, obstruction, magnet or something else at the border of the shopping area. In other instances the mechanisms are set at the checkout counter or in the area proximate thereto for subsequent actuation after a predetermined distance of travel by the cart.

Other devices operate independently of the shopping cart wheels but these devices are generally less than satisfactory because they are easily damaged, complicated to reset, easily circumvented and/or subject to inadvertent actuation during the normal contemplated use for the shopping cart.

SUMMARY OF THE INVENTION

The inventor has a device for disabling a shopping cart and which serves to disable the shopping cart when properly mounted by extending a probe to the ground and which serves to lift at least one of the cart wheels off the ground and thereby provide an obstruction to wheeled movement of the cart.

The device includes a piston which operates in a piston cylinder and is extended by the discharge of a pressurized fluid, such as carbon dioxide, into the cylinder when the device is actuated. The pressurized fluid is contained in a container that is preferably sealed and housed in the piston cylinder. The fluid is released into the piston cylinder by the automatic actuation of a mechanism that has a pin element for rupturing the seal of the container so as to release the container contents into the piston chamber. The mechanism has a magnet which functions as a sensor for other magnetic means that are located at the border of the shopping area, the magnet being repelled upon sensing the border area magnetic means and thus triggering the fluid releasing mechanism. The mechanism for releasing the fluid has a spring biased hammer that is movable to forcefully thrust the pin into the container seal when the mechanism is actuated. The ground contacting probe movement is responsive to that of the piston and the probe is preferably provided as an integral part of the piston. A housing is provided for the components of the device and in the preferred embodiment the only thing extending externally of the housing when the device is actuated is the ground contacting probe element as will subsequently seen herein.

BRIEF DESCRIPTION OF DRAWINGS

The novel features which are believed to be characteristic of this invention are set forth with particularity in the appended claims. The invention, itself, however, both as to its organization and method of operation, together with further objects and advantages thereof, may best be understood by reference to the following descriptions taken in connection with the accompanying drawings, wherein:

FIG. 1 is a side elevational view of a device embodying the principles of the invention and as seen when mounted on the wheel yoke of a shopping cart wheel assembly, certain parts of the yoke being broken away to expose the location of the disabling device and other parts of the shopping cart being omitted as unnecessary to an understanding of the invention;

FIG. 2 is a front elevational view of the device as generally seen along the Lines 2—2 of FIG. 1;

FIG. 4 is a vertical sectional view through the housing of the device as generally taken along the Lines 4—4 of FIG. 3;

FIG. 8 is a horizontal sectional view taken generally along the Lines 8—8 of FIG. 7.

BRIEF DESCRIPTION OF THE PREFERRED EMBODIMENT

Figure 6:
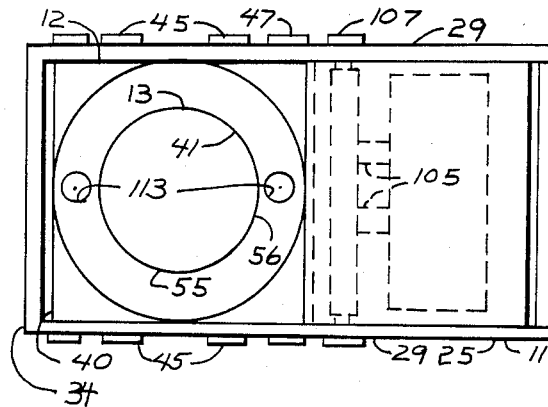
FIG. 6 is a bottom view of the device seen in FIG. 1.

Reference is now made to the drawings and wherein a device for disabling a shopping cart is designated at 10. The shopping cart 18 has a body frame that includes a frame piece 38 to which a wheel yoke 17 of a wheel assembly 16 is fixed. The wheel 24 of the assembly is rotatably mounted between the arms of the yoke 17 on an axle 37.

The disabling device is also mounted between the arms of the yoke 17 and in front of the wheel 24 in the embodiment illustrated in the drawings. The device 10 however may be appropriately mounted elsewhere on the frame. It includes a hollow housing 11 that is fixed to the yoke 17 by welds (not shown) and in the interior 19 of the housing 11, the device 10 has a piston cylinder assembly 12 with a bore that provides the chamber 20 for the piston component 13 of the device. The pressurized fluid container 14 is shown in the form of a conventional carbon dioxide cartridge which contains the gas under pressure and the cartridge 14 is housed in a cylindrical bore that provides a chamber 21 in the piston component 13 of the device and in which the cartridge 14 is received. When the shopping cart 18 is taken beyond prescribed limits in the shopping area parking lot, for instance, the device 10 is actuated by a mechanism 15 for releasing the pressurized fluid contents of the container 14. Mechanism 15 serves to rupture or break a seal of the cartridge 14 and which serves to retain the pressurized fluid within the container. Being located in the piston chamber, when the seal is ruptured, the pressurized gas in the cartridge is released from the cartridge 14 and discharges into the chamber 20. This forces the piston 13 to an extended position 22 at which the base portion 22a of the piston 13 contacts the ground 23 and lifts the adjacent wheel off the ground to disable the shopping cart. This base portion 22a serves as the ground contacting probe of the disabling device in the embodiment illustrated.

The housing 11 includes a pair of flat metal pieces 25 and 26 and a flat plastic piece 27. Metal pieces 25 and 26 are made of sheet or metal plate in the instant embodiment to facilitate assembling the pieces in the fabrication of the housing by welding procedures and to facilitate the attachment of the housing to the metal components of the cart 18 by spot welding procedures. The housing may however be molded from plastic material if desired and if other means for fastening the device to the shopping cart are employed. Metal piece 25 is bent to form an upright front or leading wall 28 as well as the opposite side walls 29 of the assembled housing 11. Piece 26, on the other hand, is bent to provide a horizontal top wall 30 and a rear or trailing wall 31 of the assembled housing. The trailing wall 31 has an inclined portion 31a at the lower end 35 of the housing 11 in the illustrated embodiment. The plastic piece 27 is L-shaped in cross section and forms a horizontal bottom wall 32 at the back end 33 of the housing 11. The piece 27 has an upright front portion 27a and which defines the rear end of a bottom opening 36 at the front end 34 of the housing. The piece 27 is made of plastic to avoid interference with the operation of the magnetic components of the triggering device as will be subsequently apparent.

The piston cylinder assembly 12 includes a metal block 40 and a breech plug 41. The block 40 has an upright cylindrical bore 20 which serves as the piston chamber and the block is provided with internal threads 42 at its lower ends 43. The breech plug 41, on the other hand, is an annular element which is provided with matching external threads 44 that permit the plug 41 to be screwed into and out of the bottom end 43 of the block 40.

The cylinder assembly 12 is secured to the housing 11 by a pair of elongated metal fasteners 45 that extend through the opposite side walls 29 and through the upper end 46 of the block 40 therebetween. At the lower end 43 of the block 40, the disabling device 10 is also provided with another pair of elongated fasteners 47. These fasteners 47 straddle the piston cylinder 20 in extending through the block 40 and also pass through the opposite side walls 29.

The elongated piston 13 has a radially outwardly projecting annular flange 50 at its upper end 51 and which is equipped with an outwardly facing annular groove 52 for an O-ring 53 that serves to seal the piston 13 along the cylindrical part of the block wall 54 that defines the piston chamber 20. The base part 22a at the lower end 55 of the piston 13 slidably fits in the cylindrical bore 56 of the breech plug 41 and here the plug 41 is provided with an inwardly facing annular groove 57 for an O-ring 58 that serves to seal the piston 13 along the cylindrical wall 59 of the plug.

Near the plug 41 and at the lower end 43 of the block 40, the wall 54 of the block 40 has a small bore or opening 60 that communicates with the exterior of the block 40 and the annular space 61 between the annular wall 62 of the piston 13 and the wall 54 of block 40. This bore 60 serves as an orifice to permit air in the space 61 between the flange 50 and breech plug 41 to escape in a regulated fashion when the device is actuated so as to prevent damage to the piston or cylinder assembly 12 when the piston is thrust to its extended position 22.

The piston 13 as seen in the drawings has a center bore which provides a chamber 21 that opens at its upper end 51 into the piston chamber 20. This chamber 21 is adapted to receive the pressurized fluid containing container or cartridge 14 and serves to retain the cartridge 14 in a working position at which the container seal 32 may be ruptured when mechanism 15 is triggered.

The mechanism for releasing the pressurized gas in container 14 has an elongated element which serves as a firing pin 65 that is mounted in the piston chamber wall 54 and at the upper end 46 of the block 40. In this respect, the block 40 has a center bore 66 at its upper end 46 which communicates with the piston chamber 20 and with a small coaxially arranged bore 67 that communicates with the exterior of the block 40 through the chamber wall 54. The pin 65 has an annular element 68 that is fixed to the pin between the upper and lower ends 70 and 69 thereof. The annular element 68 is arranged in the center bore 66 and provides a seat for an annular rubber washer 71 that seals the piston chamber from the exterior of the block in the vicinity of the pin 65. The upper portion of pin 65 extends to the exterior of the block 40 through the pin bore 67 and the upper end 70 is arranged in working alignment with a pivotally mounted hammer 75 that is actuated when mechanism 15 is triggered. The lower end 69 of the pin 65 is pointed and arranged in working alignment with the end seal 72 in container 14 so that when the pin is forcefully encountered by the hammer, it moves downward under the influence of the hammer and punctures the seal 72 of container 14 to release the pressurized gas in the container into the piston cylinder 20.

The hammer 75 of mechanism 15 is mounted at the outer end 76 of a pivot arm 77 which is pivotally connected at its inner end 78 to the block 40 by means of a pin 79. The block 40 has a corner recess 80 intermediate the opposite side walls 29 of the housing 11 and is equipped with a bore 81 that communicates with the recess 80 and is adapted for reception of the pin 79 in a press fit therein.

Figure 7:
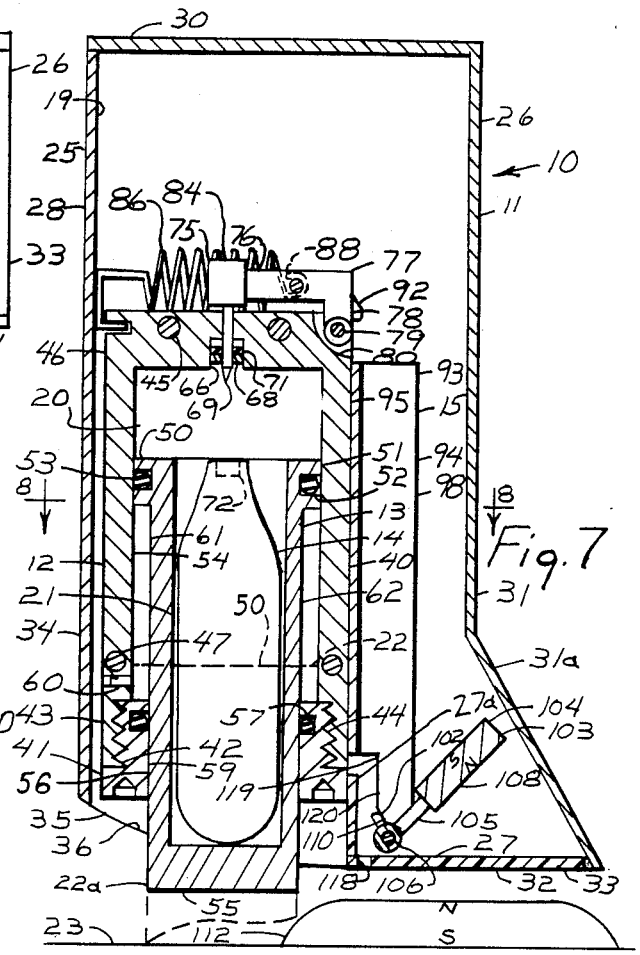
FIG. 7 is a sectional view similar to that seen in FIG. 3 but with certain of the parts shown in other positions and as seen during actuation of the piston.
Figure 3:
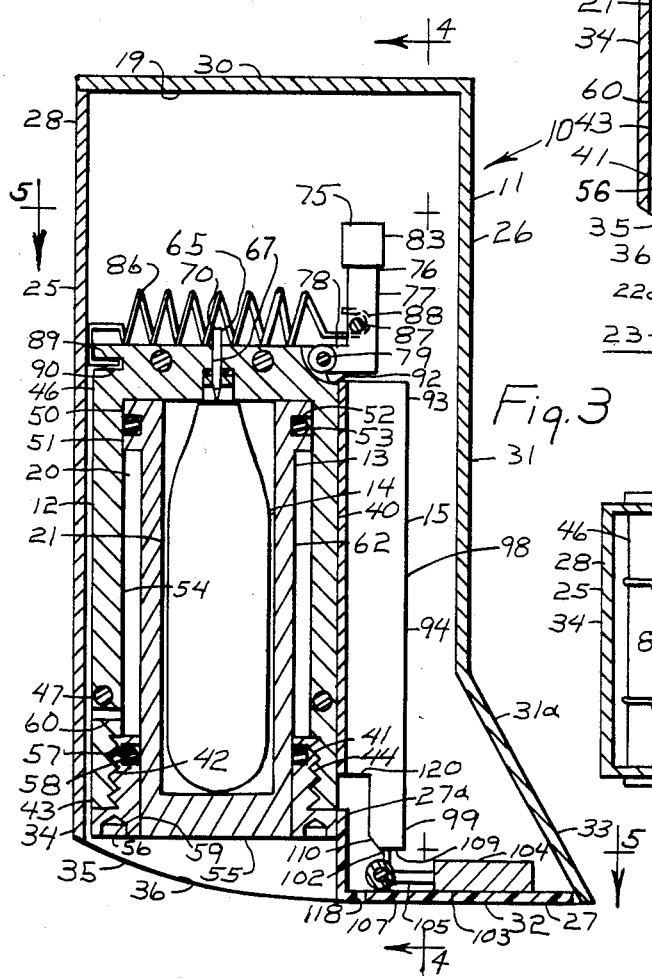
FIG. 3 is a vertical sectional view through the device as taken generally along the Lines 3—3 of FIG. 4.

The hammer 75 has an armed or cocked position seen in FIG. 3 and a fired position 84 at which it is in forceful contact with the firing pin as seen in FIG. 7. It is constantly urged into the fired position by a pair of coiled tension springs 86 that are connected with the pivot arm 77. In this respect, the hammer arm 77 has a cross pin 87 which is mounted on the arm 77 in a position which is offset from the pivot axis for the arm. The springs 86 are connected to the cross pin 87 at the opposite sides of arm 77 with one end 88 of each of the springs being hooked on the cross pin 87 while the other end 89 is received in a slot 90 at the front side of the block 40.

Figure 5:
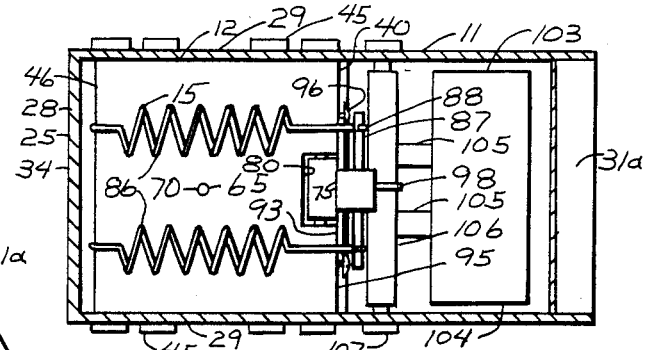
FIG. 5 is a planar sectional view taken generally along the Lines 5—5 of FIG. 3.
Figure 9:
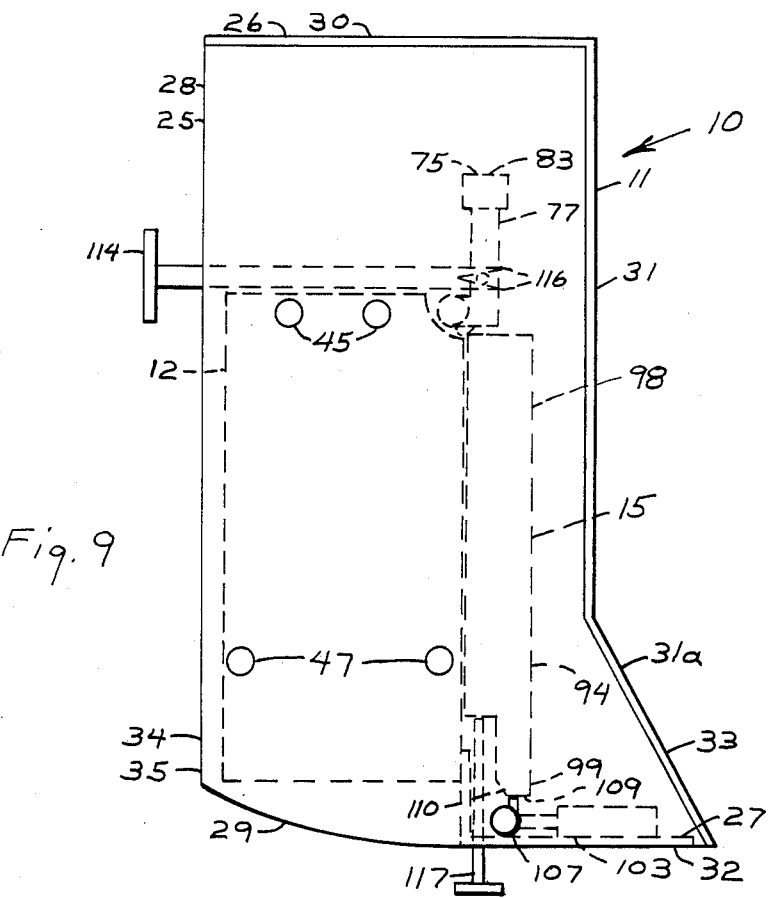
FIG. 9 is a side elevational view illustrating the process of resetting the mechanism for releasing the fluid into the piston cylinder of the device.

The hammer arm 77 has a lever or cam 92 which is engaged by the upper end 93 of a vertically movable sear piece 94 of mechanism 15 when the hammer 75 is retained at the armed position 83. The elongated sear piece 94 is T-shaped in cross section and is slidably retained against the back wall 95 of the block 40 by upper and lower fasteners 96 and 97 that are screwed into the back wall 95 and provided with heads that overlap the opposite side edges of the sear piece 94 as seen in FIGS. 5 and 8.

The web 98 of the sear 94 projects rearwardly of the back wall 95. At the bottom end 99 of the sear 94, the sear is supported on a lug forming element 102 of the trigger assembly 103 of mechanism 15 when the hammer is cocked. This lug 102 engages the lower extremity of the web 98 under such circumstances.

The trigger assembly 103 comprises a flat rectangular magnet 104 which normally rests on the plastic bottom wall 32 of housing 11 when the hammer 75 is in the armed position 93. The magnet 104 is connected to a pair of arms 105 that are fixed to a sleeve 106 that carries a radially projecting element that forms the lug component 102 of assembly 103. The trigger assembly 103 is mounted for pivotal movement about a horizontal pivot element 107 that extends through the opposite side walls of the housing and through an intervening sleeve 106 of the trigger assembly 103.

When the hammer 75 is held in its armed position 83 by the sear 94, the sear 94 is being urged downwardly by the cam 92 under the influence of the tension springs 86 on arm 77. Such movement, however, is prevented by the sear supporting lug 102 of the trigger assembly 103. However, when the trigger assembly 103 is caused to pivot upwardly about pin 107, as to the position 108 (FIG. 7), the lug 102 rides off the bottom end 109 of the sear web 98 and the sear 94 falls under the influence of tension spring 86 and comes to rest on the sleeve 106 of the assembly 103 and with the lug forming element 102 against an inclined front edge 110 of the web as seen in FIG. 7. As this happens, the hammer arm 77 is released so that the hammer 75 pivots to the fired position 84 in engagement with the pin 65. As the pin 65 is forcefully encountered by the hammer 75, the pin 65 is thrust downwardly to pierce or otherwise rupture the seal 72 of container 14 and thereby releases the pressurized gas in the container into the piston cylinder 20. As the pressurized gas is released to the cylinder 20, the piston is forced downwardly and the air in space 61 is momentarily compressed. This cushions the downward thrust of the piston and as the pressurized air in the space 61 is released through the orifice 60, the piston assumes a fully extended position 22 with the base part or probe portion 22a in contact with the ground 23. This lifts the adjacent cart wheel off the ground 23 and disables the cart by thereafter obstructing movement of the cart on the ground.

Device 10 is designed to be triggered by response to a magnetic strip 112 that is strategically located and sensed by the triggering assembly at the perimeter of the shopping area. As seen in FIG. 7, the strip 112 and magnet 104 are so polarized that like magnetic poles face each other when the device passes over the strip 112. This causes the magnet 104 of the trigger assembly 103 to be repelled and thus pivot to the triggered position therefor shown in FIG. 7.

Once the device 10 has been actuated, it can be rearmed by an employee of the merchant. In this respect, the plug 41 is provided with a pair of holes 113 for receiving a tool that is designed for use in unscrewing the plug 41 to remove and replace the carbon dioxide containing cartridge 14. As the plug 41 is unscrewed, the piston flange 50 is thereby permitted to pass below the orifice 60 and the pressurized gas that retains the piston in its extended position escapes to the exterior of the block through the orifice 60. Once the cartridge 14 has been removed, the employee inserts a forked tool 114 through a slot 115 in the front wall 28 of the housing 11 and engages the cross pin 87 between a pair of tines 116 at the end of the tool 114. Simultaneously, the employee inserts a probe or tool 117 through the aperture 118 in the bottom wall 32 of housing 11 and to the extent that it engages a lower portion 119 of the sear web 98 in an area of a cutout 120 that is provided at the lower end 99 of the sear 94. By pushing inwardly on tool 114, the arm can be pivoted against the urgings of spring 86 from the fired position to the armed position therefor. When the arm 77 reaches the armed position, a slight inward thrust on the tool 117 will cause the cam 92 to be engaged by the sear 94 and simultaneously permits the trigger assembly to pivot to its normal position shown in FIG. 3. At this position of the trigger assembly, the sear 94 can rest on the lug 102 of the trigger assembly 103 and retain the hammer at its armed position. Thereafter the new cartridge 14 can be inserted into the piston bore 21, the piston inserted in chamber 20 and the plug 41 replaced to re-arm the device.

While only a certain preferred embodiment of this invention has been shown and described by way of illustration, many modifications will occur to those skilled in the art and it is, therefore, desired that it be understood that it is intended herein to cover all such modifications that fall within the true spirit and scope of this invention.

What is claimed as new and what it is intended to secure by Letters Patent of the United States is:

1. A shopping cart disabling device comprising means forming a piston chamber, pressurized fluid containing means arranged to discharge its pressurized fluid contents into the piston chamber, means arranged to cooperate with the containing means and being automatically actuatable to release its pressurized fluid contents therefrom, and piston means located in the chamber and being movable to an extended position by the release of pressurized fluid from the containing means.

2. A shopping cart disabling device in accord with claim 1 which further comprises a housing that contains the piston chamber forming means and the automatically actuatable means in the interior thereof.

3. A shopping cart disabling device in accord with claim 1 wherein the containing means has a seal preventing the release of the pressurized fluid contents therefrom, and wherein the releasing means has an element for penetrating the seal to release the pressurized fluid contents of the containing means.

4. A shopping cart disabling device in accord with claim 3 wherein the releasing means also has a movable magnet and wherein said element is actuated to penetrate the seal by movement of said magnet.

5. A device for use in disabling shopping carts comprising means having a wall that defines a piston chamber, a piston located in the chamber and having another chamber which opens into said piston chamber, a pressurized fluid containing container located in the other chamber and having a seal for retaining the pressurized fluid within the container, and a mechanism that is automatically actuatable to release the pressurized fluid contents of the container into said piston chamber and having an elongated element that extends through said wall and is forcefully movable to penetrate the seal of said container and thereby release the fluid contents into said piston chamber, said piston having an extended position and being movable thereto by the release of the fluid contents into said piston chamber.

6. A device for use in disabling shopping carts in accord with claim 5 wherein said mechanism has a hammer that is mounted for pivotal movement on the wall having means between a first position in forceful contact with said element and a second position which is pivotally offset therefrom, means biasing the hammer into said first position, releasable means retaining the hammer at said second position, and a magnet movable to actuate the mechanism by releasing the hammer retaining means.

* * * * *